United States Patent
Obrestad et al.

(10) Patent No.: US 6,610,267 B1
(45) Date of Patent: Aug. 26, 2003

(54) METHOD FOR MANUFACTURING A CALCIUM NITRATE MELT AND PRODUCT THEREOF

(75) Inventors: Torstein Obrestad, Ulefoss (NO); Lars Gustav Moland, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/743,191

(22) PCT Filed: Jun. 11, 1999

(86) PCT No.: PCT/NO99/00192

§ 371 (c)(1),
(2), (4) Date: Feb. 23, 2001

(87) PCT Pub. No.: WO00/02831

PCT Pub. Date: Jan. 20, 2000

(30) Foreign Application Priority Data

Jul. 8, 1998 (NO) .......................................... 19983156

(51) Int. Cl.$^7$ ................................................. C01F 11/36
(52) U.S. Cl. .......................... 423/395; 23/293 R; 71/58
(58) Field of Search .............................. 71/58; 423/395; 23/293 R

(56) References Cited

U.S. PATENT DOCUMENTS 4,248,644 A  *  2/1981  Healy ........................... 149/21

FOREIGN PATENT DOCUMENTS

| DK | 44877 | 11/1931 |
|---|---|---|
| GB | 392531 | 5/1933 |
| SU | 1763436 | 9/1992 |
| SU | 990752 | 10/1999 |
| WO | 97/15536 | 5/1997 |

* cited by examiner

*Primary Examiner*—Wayne A. Langel
(74) *Attorney, Agent, or Firm*—Wenderoth, Lind & Ponack, L.L.P.

(57) ABSTRACT

The invention relates to a method for manufacturing a homogeneous and ammonium free calcium nitrate melt with high solidification temperature, suitable for conventional particulation methods, by mixing a potassium source with a calcium nitrate source and heating the formed mixture to 150–155° C. for forming a melt comprising 1.5–5.5% by weight of K (as $KNO_3$), 13–18% by weight of water and 70–80% by weight of $Ca(NO_3)_2$. The invention further relates to homogeneous and ammonium free calcium nitrate particles where the particles are a particulated product from a melt comprising 1.5–5.5% by weight of K (as $KNO_3$), 13–18% by weight of water and 70–80% by weight of $Ca(NO_3)_2$.

11 Claims, 1 Drawing Sheet

METHOD FOR MANUFACTURING A CALCIUM NITRATE MELT AND PRODUCT THEREOF

Figure 1:
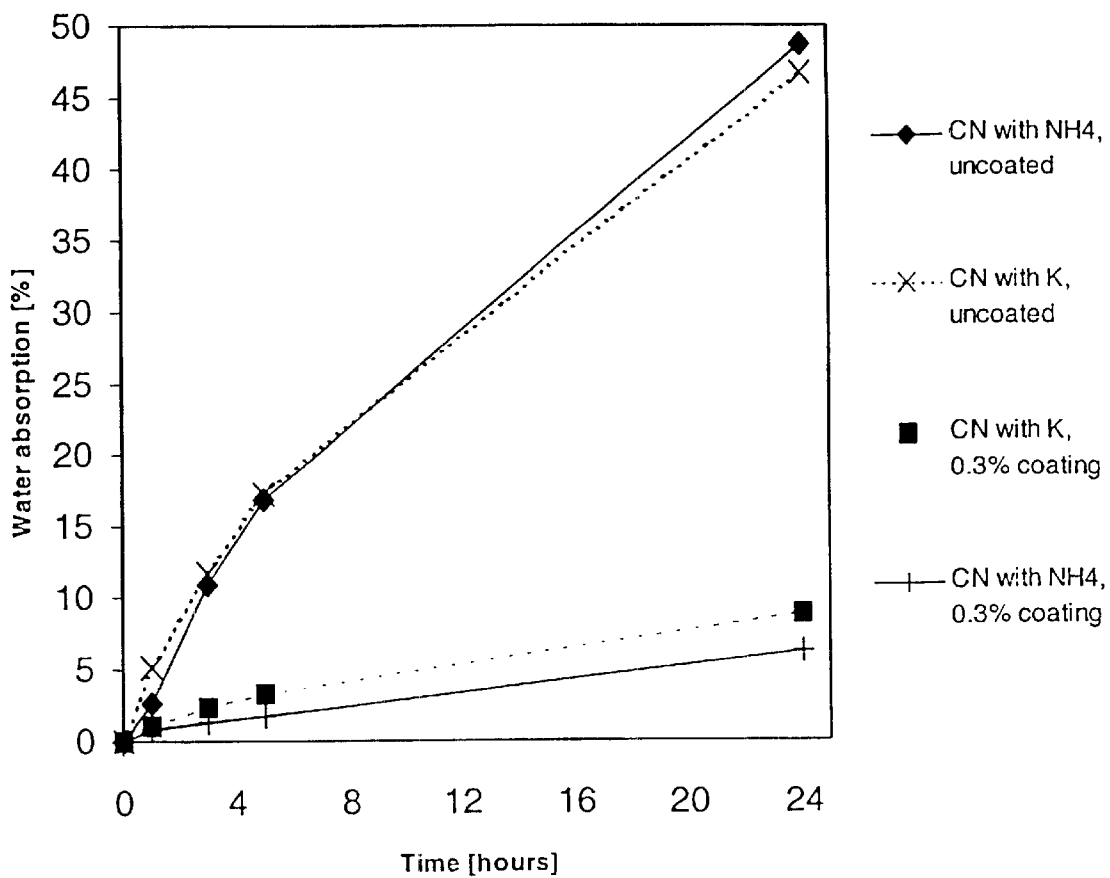

This application is a 371 application of PCT/NO99/00192 filed Jun. 11, 1999.

The present invention relates to a method for manufacturing a homogeneous and ammonium free calcium nitrate melt with high solidification temperature suitable for conventional particulation methods. The invention further comprises products of such melt.

Today pure $Ca(NO_3)_2$ (abbreviated as CN) is commercially available as crystalline products, mainly $Ca(NO_3)_2 \cdot 4H_2O$, and as aqueous solutions containing 45–50% $Ca(NO_3)_2$.

Aqueous CN products have high handling costs in addition to containing much water.

Consequently, the logistic costs on nutrient basis are rather high.

The crystalline products have poor handling properties with high caking tendency, high dust content and low melting point (43–50° C.). Thus CN crystals are not suitable for bulk handling.

Due to low solidification temperature (43–50° C.) and undercooling, it is extremely difficult to obtain pure CN particles from a CN melt by using traditional particulation methods as granulating or prilling.

To improve the solidification property and avoid undercooling $NH_4NO_3$ (abbreviated as AN) has been added to the melt.

Today Norsk Hydro's solid calcium nitrate product; NH-CN, contains 6–8% by weight AN, 15% by weight of crystalline water and 77–79% by weight of $Ca(NO_3)_2$.

For some applications, however, the $NH_4$-content in the calcium nitrate product is a significant disadvantage. For instance as setting accelerator in concrete where $NH_4$ reacts to $NH_3$-gas, and for some agronomic applications.

From the Norwegian patent application NO 954336 it is known NK fertilisers containing 55–85% $KNO_3$ (abbreviated as KN) and 14–40% $Ca(NO_3)_2$ and a method for manufacturing these fertilisers.

The product range covered in this application was intended to be a complementary fertiliser in the pure $KNO_3$ market. Sufficient solidification properties and particle strength were obtained by evaporating the melt to a very low water content (0.5–6%). Hence, the physical properties and the process requirements as evaporation and particulation parameters, for the melts covered in NO 954336 were quite different from those according to the present invention.

Another objective of the invention according to NO 954336 was to make a fertiliser rich in K that could be blended mechanically with NH-CN to cover the range from 0–33% K. Consequently, all the grades containing less than 21% K will be mechanical mixtures, containing $NH_4$ from the regular CN. Mechanical mixtures with low K-content contain almost the same amount of $NH_4$ as regular NH-CN, making them unsuitable for the earlier mentioned applications. The products according to the present invention are homogeneous that contain no $NH_4$.

NO 954336 describes a homogeneous NK product containing 55–85% of KN contrary to the product according to the present invention which basically is a CN product containing minor amounts of KN and with no $NH_4$.

The main object of the invention was to arrive at a complementary calcium nitrate product to the crystalline and liquid $Ca(NO_3)_2$ product.

Another object of the invention was to arrive at a homogeneous and ammonium free calcium nitrate in granular or prilled form.

A further object of the invention was to arrive at a homogeneous and ammonium free calcium nitrate in granular form with good handling and storage properties.

The inventors have been investigating different ways of substituting the ammonium content in NH-CN without reducing the quality of the product.

Furthermore, it was important that the new CN melt had good solidification properties to utilise conventional particulation processes as granulation or prilling. This demands that the melt is not undercooling too much, and that the solidification temperature is reasonable high.

In the present invention a melt is defined to be an aqueous solution containing not more than 22% water.

The inventors found that homogeneous CN particles with excellent properties were obtained when the $NH_4$-content in NH-CN was replaced with a potassium source in a certain consentration. This replacement raises the solidification temperature of the melt from 43–50° C. (for a pure CN melt) to 85–90° C. (for a (CN+K) melt) making it suitable for conventional particulation processes as granulation and prilling.

The CN melt was manufactured by mixing the potassium source with a calcium nitrate source. An aqueous $Ca(NO_3)_2$-solution is suitable as a calcium nitrate source. Potassium nitrate (KNO3) in a solid or aqueous form is suitable as a K-source. Another alternative potassium source is KOH neutralised with nitric acid.

Prior to the conventional particulation, the water content in the melt was adjusted by evaporation.

Furthermore, it was found that undercooling was avoided and particulation with conventional methods was possible when the CN melt had a certain consentration range of K, water and CN. This range is defined as follows:

1.5–5.5% by weight of K (as $KNO_3$)
13–18% by weight of water
70–80% by weight of $Ca(NO_3)_2$ In view of these findings particulation of melts within the above mentioned ranges were performed.

Granulation tests were carried out in a pilot scale pan granulator, with good results. Layering was obtained as the dominating particle growth mechanism with a granulation temperature of 84° C. The particles from the granulator were of nice spherical shape, and the crushing strength of 2.8 mm particles were 3–5 kg. No caking or post reactions occurred during cooling of the material.

The optimal composition of the melt for granulation seemed to be 74–75% $Ca(NO_3)_2$, 15–16% water and 2.5–4.0% K.

Prilling tests were carried out with good results. Appropriate melt temperature was 90° C. and, as for regular NH-CN, 1–5% seed crystals had to be mixed into the melt before prilling. The results were good for the whole concentration range but, as for granulation, the optimal composition of the melt seemed to be about the same as for particulation by granulation.

The scope of the invention and its special features are as defined by the attached claims.

The invention will now be further explained in connection with the description of the examples and the figure.

FIG. 1 shows water absorption at 25° C. and 70% RH of CN with K according to the invention compared with corresponding results for regular CN with $NH_4$.

EXAMPLE 1

This example shows granulation of $Ca(NO_3)_2$ with 3.6% K ($KNO_3$ as potassium source).

94.2 weight % of 50% $Ca(NO_3)_2$-solution was mixed with 5.8 weight % crystalline $KNO_3$, and heated to 155° C., giving the melt a water content of ~15.5%.

Some of the melt was solidified and crushed to particles of 0.7–2.0 mm (d50:1.3mm). The particles were fed to a pan granulator (diameter: 24 cm) as building material. The melt was then sprayed into the granulator. Appropriate granulation temperature was ~84° C. The granulation properties of the melt were very good.

Because layering was the dominating particle growth mechanism, the visual appearance of the particles from the granulator was very good, both regarding roundness and smoothness.

The finished product from the granulator had a d50 of 2.3 mm, with a particle strength of 3–5 kg for 2.8 mm. No caking or post reactions occurred during cooling of the material.

EXAMPLE 2

This example shows granulation of $Ca(NO_3)_2$ with 4.0% K (KOH as potassium source).

96.4 wt % of melted $Ca(NO_3)_2$-crystals from the Nitrophosphate process (containing 60% $Ca(NO_3)_2$, 37% water and 3% $HNO_3$)+3.6 wt % of 13M Nitric Acid ($HNO_3$) was mixed and neutralised to pH 5–6 with a 50% KOH-solution. The mixture was then stirred for 15 minutes to dissolve the CaO-precipitations. The mixture was heated to a temperature of ~155° C. (1 atm. pressure) resulting in a water content of 15.5%. The melt was subsequently granulated according to the method in example 1. The granulation properties and product properties were similar to that obtained in example 1.

EXAMPLE 3

This example shows granulation of $Ca(NO_3)_2$ with 2% K (KNO3 as potassium source).

Melted $Ca(NO_3)_2$-crystals from the Nitrophosphate process was neutralised to pH 5–6 with CaO. Crystalline $KNO_3$ was then mixed into the melt, and dissolved at 90° C. The mixture, with a Ca/K-ratio of 9.6, was heated to ~153° C., resulting in a water content of ~16%.

The melt was then cooled to 110° C., and granulated according to the same procedure as in example 1. Appropriate granulation temperature for this melt was 81° C. Except for this, the granulation properties and product properties were similar to that obtained in example 1.

EXAMPLE 4

This example shows prilling of $Ca(NO_3)_2$ with 3% K (KOH as potassium source).

$CaCO_3$ was dissolved in 13M $HNO_3$. The K-content was then adjusted with 50% KOH-solution to a Ca/K ratio of ~6.2, and the pH was adjusted to 5–6 with nitric acid. The melt was heated to 155° C., cooled to 90° C. and 3% seed crystals were added, whereupon the melt was transferred to a prilling device and prilled into an oil bath. A nice product with particle strength of 5 kg for 3 mm particles was obtained.

EXAMPLE 5

This example shows prilling of $Ca(NO_3)_2$ with 5% K (KNO3 as potassium source).

76.9 wt % of 50% $Ca(NO_3)_2$-solution was mixed with 23.1 wt % of 30% KNO3 solution. The mixture was heated to 155° C., cooled to 90° C., added 5% seed crystals and prilled into an oil bath. Although the solidification time was somewhat higher than the melt in example 4, the prilling properties and product properties were nearly as good as that obtained in example 4.

The new homogeneous and AN free CN particles were further tested with regard to product properties as e.g. caking and water absorption.

These properties were compared with the same properties for regular CN with $NH_4$. The results are shown in Table 1 and 2 and FIG. 1.

According to FIG. 1, the water absorption is approximately the same for Norsk Hydro's regular CN with $NH_4$, and CN with K. The effect of applying 0.3% of Wax-Polymer-Oil-coating is approximately the same for CN with NH4 and the product according to the present invention.

TABLE 1

Product properties of granular NH—CN (CN + $NH_4$) and CN with 3.6% K

|  | CN + K | CN + $NH_4$ |
|---|---|---|
| Particle strength for 2.8 mm granules | 3–6 kg | 3–6 kg |
| bulk density | 1.05–1.2 kg/l | 1.05–1.2 kg/l |
| water vapour pressure | 2.5–12 mb(25° C.) (vary with water content) | 2.5–12 (vary with water content) |
| caking tendency | very low | very low |
| dissolving time | easy dissolvable, rate varies with temp. and particle size | easy dissolvable, rate varies with temp. and particle size |

Table 1 shows that the values for CN+K are the same as for regular CN with $NH_4$.

TABLE 2

Physical data for CN-melts with $NH_4$ and K

|  | Regular CN with $NH_4$ | CN with K |
|---|---|---|
| $T_{solidification}$ | 90–94° C. | 84–88° C. |
| Viscocity | ~600 cP | 600–800 cP |
| Crystallisation heat | ~30 cal/g | ~30 cal/g |
| Density | 1.9 g/ml | 1.9 g/ml |

The viscosity of the melts also depends on the content of water and trace elements (impurities).

The boiling point curve is identical for CN with $NH_4$ and CN with K.

By applying the above procedure it will be possible to make homogeneous, $NH_4$-free, CN-particles with superior product properties. The product according to the invention is a complementary product to the crystalline- and liquid-market for pure $Ca(NO_3)_2$. The product according to the invention is free flowing, has low dust content, high melting point and high nutrient content.

What is claimed is:

1. A method for manufacturing a homogeneous and ammonium free calcium nitrate melt with high solidification temperature suitable for particulation, which comprises mixing a potassium source with a calcium nitrate source, and heating the formed mixture to 150–155° C. to form a homogeneous and ammonium free melt comprising 1.5–5.5% by weight of K (as $KNO_3$), 13–18% by weight of water, and 70–80% by weight of $Ca(NO_3)_2$.

2. A method according to claim 1, wherein the formed mixture is heated to 150–155° C. to form a homogeneous and ammonium free melt comprising 2.5–4.0% by weight of K (as $KNO_3$), 15–16% by weight of water, and 74–75% by weight of $Ca(NO_3)_2$.

3. A method according to claim 1, wherein a solid $KNO_3$ or a $KNO_3$ solution is applied as a potassium source.

4. A method according to claim 1, wherein a potassium hydroxide (KOH) neutralised with nitric acid is applied as a potassium source.

5. A method according to claim 1, wherein an aqueous $Ca(NO_3)_2$-solution or melt is applied as a calcium nitrate source.

6. Homogeneous and ammonium free calcium nitrate particles, which are a particulated product from a melt comprising 1.5–5.5% by weight of K (as $KNO_3$), 13–18% by weight of water, and 70–80% by weight of $Ca(NO_3)_2$.

7. Homogeneous and ammonium free calcium nitrate particles according to claim 6, which are a particulated product from a melt comprising 2.5–4.0% by weight of K (as $KNO_3$), 15–16% by weight of water, and 74–75% by weight of $Ca(NO_3)_2$.

8. Homogeneous and ammonium free calcium nitrate particles according to claim 6, wherein the particles are a prilled product from the melt.

9. Homogeneous and ammonium free calcium nitrate particles according to claim 6, wherein the particles are a granulated product from the melt.

10. Homogeneous and ammonium free calcium nitrate particles according to claim 7, wherein the particles are a prilled product from the melt.

11. Homogeneous and ammonium free calcium nitrate particles according to claim 7, wherein the particles are a granulated product from the melt.

* * * * *